United States Patent [19]

Trudeau et al.

[11] Patent Number: 5,560,591
[45] Date of Patent: Oct. 1, 1996

[54] LEVELING VALVE FOR AIR SPRINGS

[75] Inventors: Curtis A. Trudeau, Caledonia; Gary L. Schafer, Shelbyville; Dick E. Winter, Kentwood; Dennis S. Shimmell, Hudsonville; Sean P. Seaver, Kentwood, all of Mich.

[73] Assignee: Hadley Products, Grandville, Mich.

[21] Appl. No.: 432,989

[22] Filed: May 2, 1995

[51] Int. Cl.$^6$ .................................................. B60G 11/26
[52] U.S. Cl. .............................. 267/64.16; 137/627.5; 251/80; 280/714
[58] Field of Search ........................ 137/627.5; 251/80; 267/64.16, 64.28; 280/711, 714

[56] References Cited

U.S. PATENT DOCUMENTS

| | | |
|---|---|---|
| 2,787,475 | 4/1957 | Jackson . |
| 3,026,103 | 3/1962 | Gates . |
| 3,091,257 | 5/1963 | Ballard et al. . |
| 3,215,426 | 11/1965 | Engels . |
| 4,360,191 | 11/1982 | Urushiyama . |
| 4,697,822 | 10/1987 | Blanz . |
| 4,911,468 | 3/1990 | Fukunaga . |
| 5,161,579 | 11/1992 | Anderson, Jr. ..................... 137/627.5 |
| 5,161,817 | 11/1992 | Daum et al. ............................ 280/714 |
| 5,220,982 | 6/1993 | Anderson, Jr. ..................... 267/64.16 X |

FOREIGN PATENT DOCUMENTS

| | | |
|---|---|---|
| 3915826 | 6/1990 | Germany . |
| 1078543 | 1/1966 | United Kingdom . |

*Primary Examiner*—Josie Ballato
*Attorney, Agent, or Firm*—Price, Heneveld, Cooper, DeWitt & Litton

[57] ABSTRACT

A leveling valve for controlling the amount of air within an air spring for maintaining a constant level of a vehicle chassis or frame relative to its axles. The valve includes several features including a novel actuating mechanism for actuating the valve. The mechanism includes a sleeve assembly slideable on an actuating plunger and constructed of three parts so designed as to compensate for any wear between the sleeve assembly and the actuator for the sleeve. Another feature is the construction of the elongated actuator extending between one end of the valve body wherein the actuating mechanism is located and the other end wherein a valve is located. Still another feature is the construction of the valve for metering the exhaust of air through the exhaust outlet, such metering being determined by the position of the actuator arm as the air spring adjusts to find the proper height. The fourth feature resides in a one-piece, molded dampening cylinder, dump cylinder, and guide for the valve actuator.

27 Claims, 6 Drawing Sheets

LEVELING VALVE FOR AIR SPRINGS

BACKGROUND OF THE INVENTION

This invention relates to an improvement of the leveling valve disclosed in assignee's U.S. Pat. No. 5,161,579 entitled LEVELING VALVE FOR AIR SPRINGS. More specifically, this invention relates to a leveling valve for controlling the amount of air within an air spring mounted between two members, at least one of which is movable relative to the other. The leveling valve of this invention controls the air pressure in the air spring in response to changes in the distance between two such members and has its greater use in maintaining the constant level of a vehicle chassis or frame relative to its axles in response to the loading and unloading of the vehicle.

In assignee's U.S. Pat. No. 5,161,579, there is disclosed a leveling valve for air springs which incorporates in one body the actuating mechanism, a dampener, a valve means actuated by the actuating mechanism, an over-travel mechanism, and a pilot-operated dump means for dumping the air from the air spring through the valve. This feature is accomplished by providing an elongated body having an air inlet port, an air outlet delivery port, an air outlet exhaust port, and a valve means all located at one of the ends of the body. An actuator mechanism is located at the other end of the body and an elongated actuator extends essentially the entire length of the elongated body to the valve means.

One feature of U.S. Pat. No. 5,161,579 is an over-travel actuating mechanism which includes a valve travel limit and an over-travel means which provides for take up of the over-travel of the valve actuating mechanism. This is accomplished by a sliding sleeve located about a plunger and between two coil springs. The sleeve is actuated by two rotatable eccentric means mounted on the elongated valve body, one on each side of the sleeve. A forked actuator arm has a first arm connected to a rotatable eccentric means located on one side of the sleeve and a second arm connected to a rotatable eccentric means located on the other side of the sleeve. These two arms are actuated in response to changes in distance between two members between which an air spring is mounted.

Another feature of U.S. Pat. No. 5,161,579 is a means for quickly dumping the air from the air springs through an exhaust port. This is accomplished by providing a dump piston located in a separate piston cylinder that is in communication with a dump pilot port. The dump piston is actuated by subjecting it to air pressure introduced through the dump pilot port causing it to engage a snap ring on the plunger to open the valve means and provide communication between the delivery port and the exhaust port so that the air in the air bag is dumped or exhausted through the exhaust port.

Another unique feature of U.S. Pat. No. 5,161,579 is the construction of a dampener which is a separate self-contained member formed of a piston cylinder part and a cap connected to each other and having a piston mounted in the chamber between the parts. Extending from both sides of the piston are hubs exposed to the exterior of the dampener cylinder. The piston is interconnected to the plunger by a stop means extending radially from the plunger and located between the dampener and the valve means. The plunger is interconnected to the piston by a coil spring circumventing the plunger and extending between one of the hubs of the piston and the plunger actuating mechanism. Thus, the valve has the unique feature of two springs normally maintaining the plunger in the neutral position in which position the valve means is closed. The "time to travel" motion of the plunger for actuating the valve means is controlled by a viscous fluid moving from one side of the piston to the other.

Although the invention of U.S. Pat. No. 5,161,579 is a vast improvement over other leveling valves for air springs, in the further development of such leveling valve, as employees of the assignee of such patent, we have discovered improvements of such leveling valves. Specifically, one of such improvements is the construction of the sleeve as described above. In the sleeve of U.S. Pat. No. 5,161,579, the sleeve is one piece actuated by eccentrically-actuated dogs each having a cylindrical pin portion and a rectangular cam portion. The cam portion is extended into slots in the sleeve in which they are adapted to slide. In sliding within the slots, the wall of the slots and the dogs wear, creating accuracies in the actuation of the valve.

In accordance with the present invention, the sleeve is constructed of three parts including two end parts and a center part. Pins mounted eccentrically on rotatable members are connected to opposite sides of the center part and slideably actuate the center part along and transversely of the longitudinal axis of the plunger. Although wear may occur between the center part and the two end parts, the springs circumferentially mounted around the plunger force the end parts against the center part, taking up any wear that may occur on either or both of the center and end parts. Thus, the construction of our sleeve compensates for any wear in the sleeve. Further, the three-part sleeve maximizes the longitudinal forces exerted by the eccentric actuating means on the plunger while minimizing any forces transverse to the plunger.

Another unique feature of the present invention is the construction of the elongated actuator extending from the end of the elongated body where the eccentric actuating mechanism is located to the other end of the body where the valve means is located. In accordance with this invention, this elongated actuator means comprises the heretofore described plunger to a dampening piston, a dump piston, and another plunger. The dampening piston, dump piston, and said other plunger are formed as an integral one piece. In a more specific aspect of this feature of the invention, the first plunger is adjustably connected to the dampening piston whereby the length of the elongated actuator means within the elongated body can be adjusted. This is accomplished by providing a threaded hole extending into the dampening piston into which the threaded end of the first plunger is adjustable.

Another feature of this invention is the provision for a one-piece, molded dampening cylinder, dump cylinder, and guide for the second plunger referred to above. Such cylinders respectively receive the dampening piston, the dump piston, and the second plunger, all of which are molded into one piece.

Still another feature of our invention resides in a new and novel valve means which reduces air consumption, increases the life of the air compressor for supplying air to the air springs, and thus saves fuel and permits smaller compressors. Such valve construction also reduces the variation in the suspension ride height by metering and smoothing out the quantity of air flowing through the inlet exhaust ports. The metered flow of air through the exhaust port is accomplished by providing a pintel at the extreme end of the second plunger of the valve actuator, which end opens and closes communication between the inlet port and delivery port and the delivery port and exhaust port. The pintel is precisely dimensioned to create a metered air flow at the desired valve actuator lever angles. In other words, the diameter of the pintel controls the quantity of air flow through the exhaust port as the air springs adjust to find the proper height. The metering of the flow of air through the inlet port is accomplished by providing meter openings adjacent to and located upstream of the valve seat which is opened and closed by the second plunger.

Having described the novel and unique features of our invention, reference is now made to the drawings and the following description made in conjunction with the drawings.

DESCRIPTION OF THE PREFERRED EMBODIMENT

Figure 1:
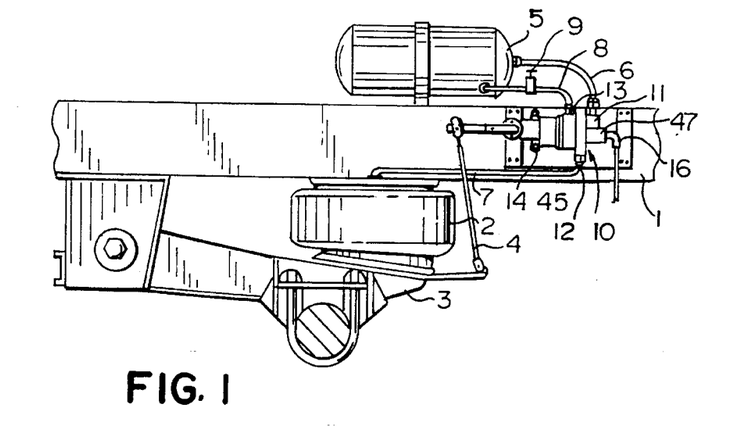
FIG. 1 is a side-elevational view of a schematic illustrating the leveling valve of this invention utilized in conjunction with an air spring for a vehicle.
Figure 2:
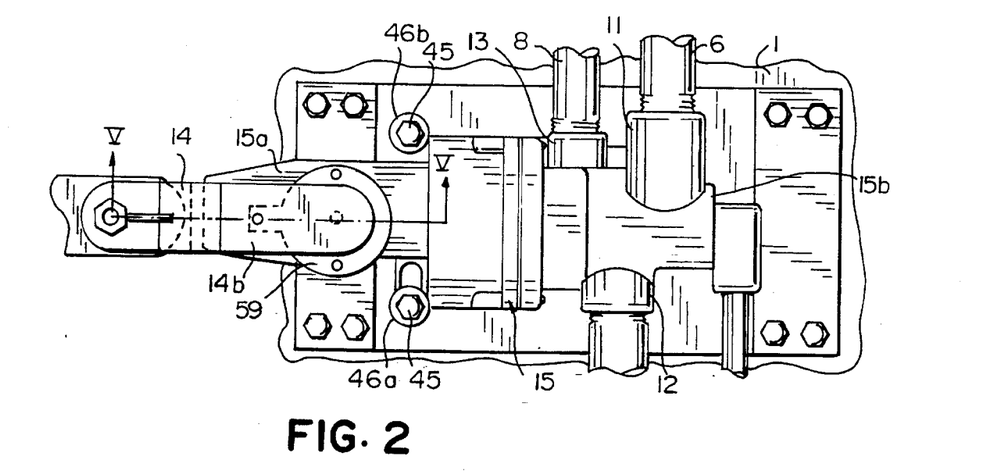
FIG. 2 is an enlarged, side-elevational view of the leveling valve of this invention.
Figure 3:
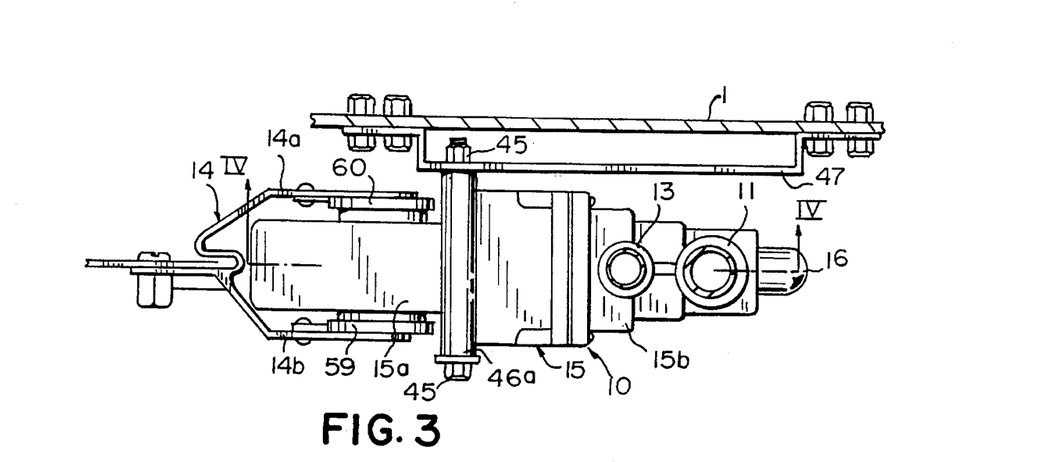
FIG. 3 is a top plan view of the valve disclosed in FIGS. 1 and 2.

Referring to the drawings, FIGS. 1, 2, and 3 disclose the leveling valve 10 mounted on the frame 1 of a vehicle by the bolts 45 extending through the openings in flanges 46a and 46b and attached to bracket 47. Valve 10 is adapted to supply air to the air spring 2 which is mounted between the frame 1 and the axle support 3. A linkage 4 adjustable on arm 14 is shown connected between the arm 14 of valve 10 and the axle support 3 so that when a load is placed on or removed from the vehicle, causing the frame to move downwardly or upwardly, respectively, the leveling valve 10 will be actuated by arm 14 to either deliver or exhaust air from the air spring 2. Air is supplied from a source of air pressure such as the tank 5 by the supply tube 6 connected to an inlet port 11. The air is delivered to the air spring through the delivery tube 7 which is connected to the delivery port 12. Should it be desirable to exhaust all of the air from the air spring 2, a dumping means is provided in the valve 10, as will be explained hereinafter. The dumping valve is actuated by air introduced into the leveling valve 10 through dump pilot tube 8 which includes a manually operated valve 9. When the valve 9 is opened, air from the tank 5 passes through tube 8 which is connected to the dump pilot port 13. As disclosed in FIG. 1, the normal operation of the leveling valve is controlled by the actuator arm 14 to which the linkage 4 is connected.

Figure 4:
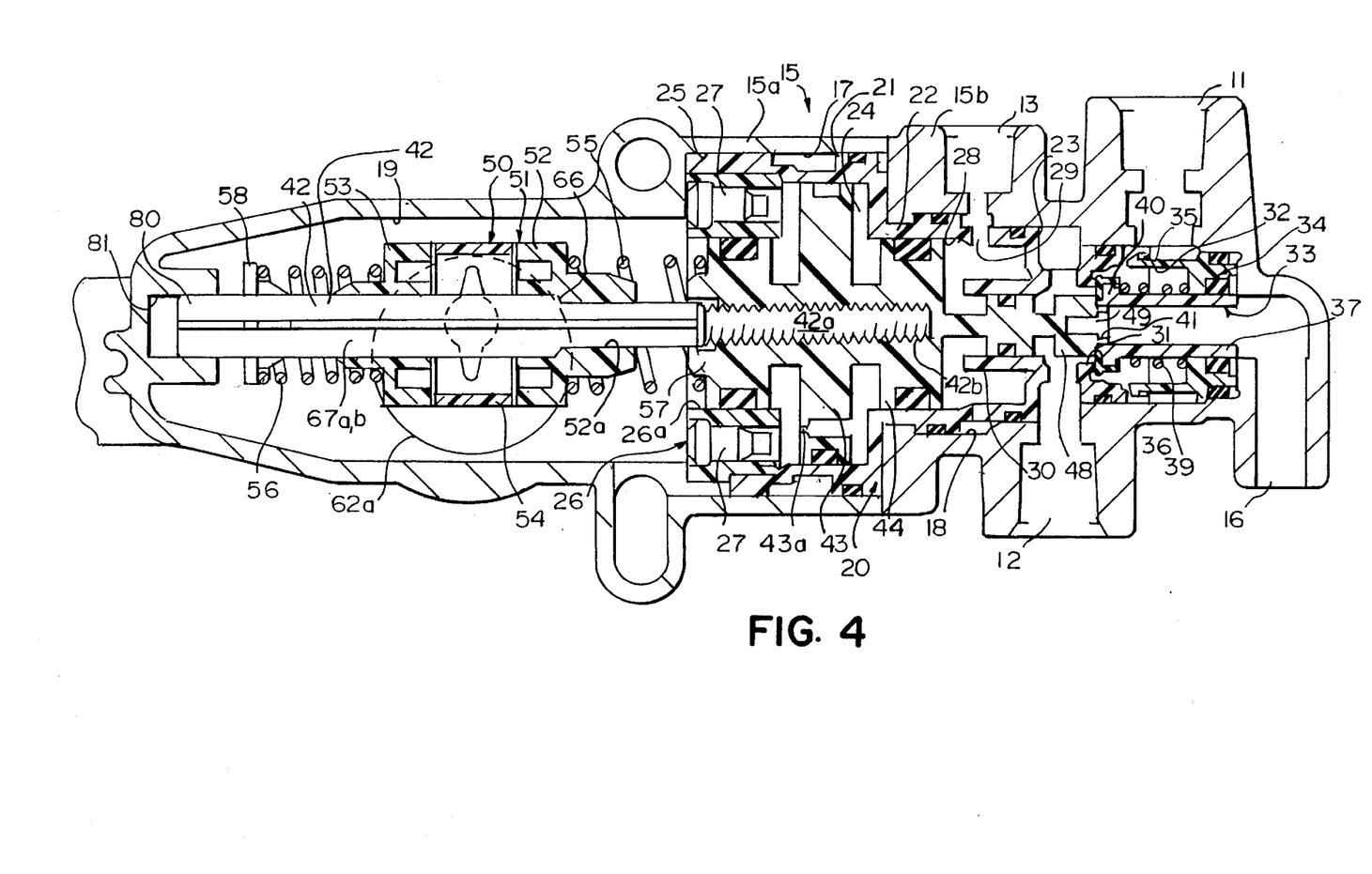
FIG. 4 is a cross-sectional view of the valve of FIGS. 1, 2, and 3 taken along the plane IV—IV of FIG. 3.
Figures 5, 11, 12:
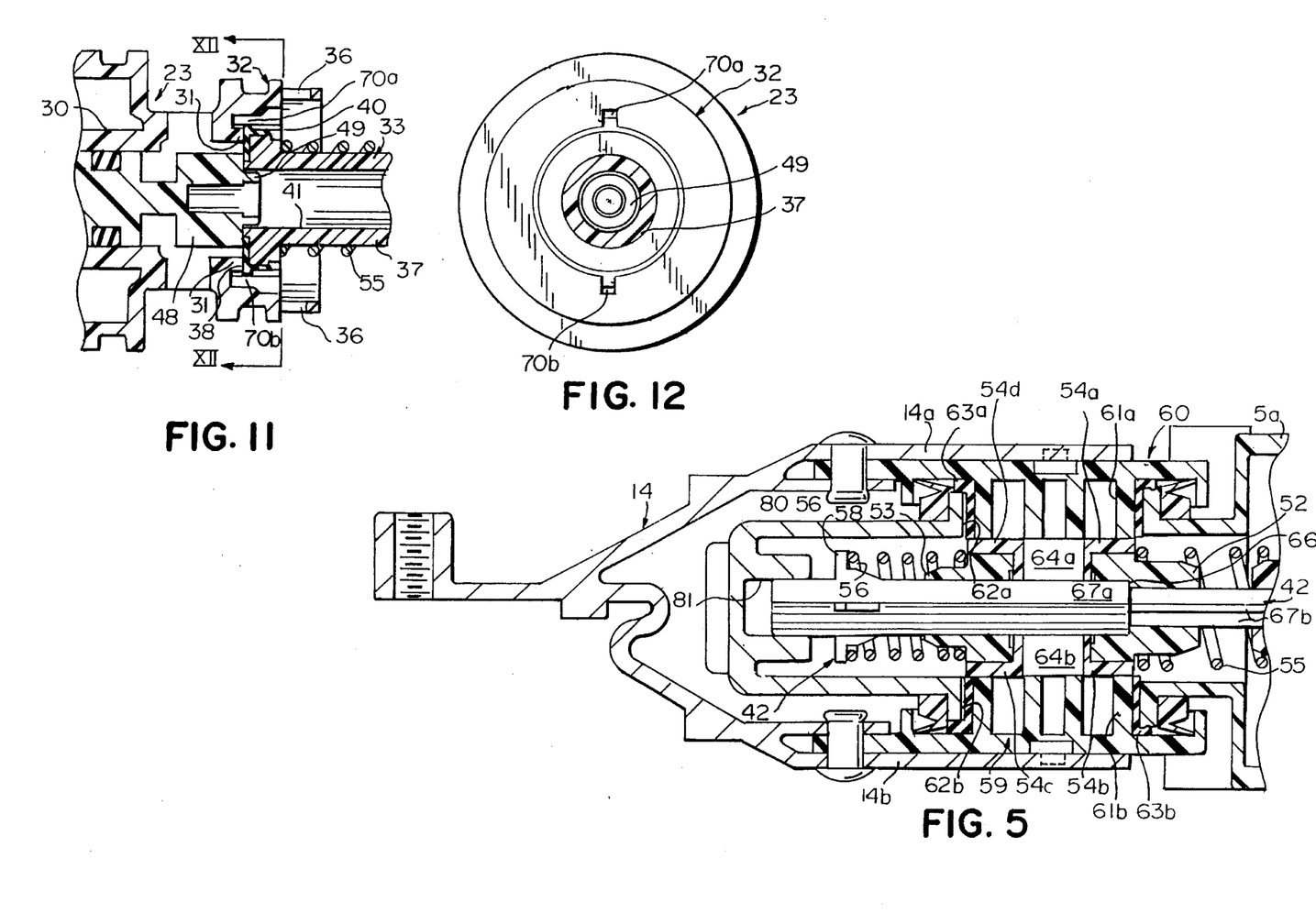
FIG. 5 is a cross-sectional view of one end of the valve of this invention taken along the plane V—V of FIG. 2.
FIG. 11 is a partial side-elevational view of a portion of the valve.
FIG. 12 is a cross-sectional view taken along the plane XII—XII of FIG. 11.
Figure 6:
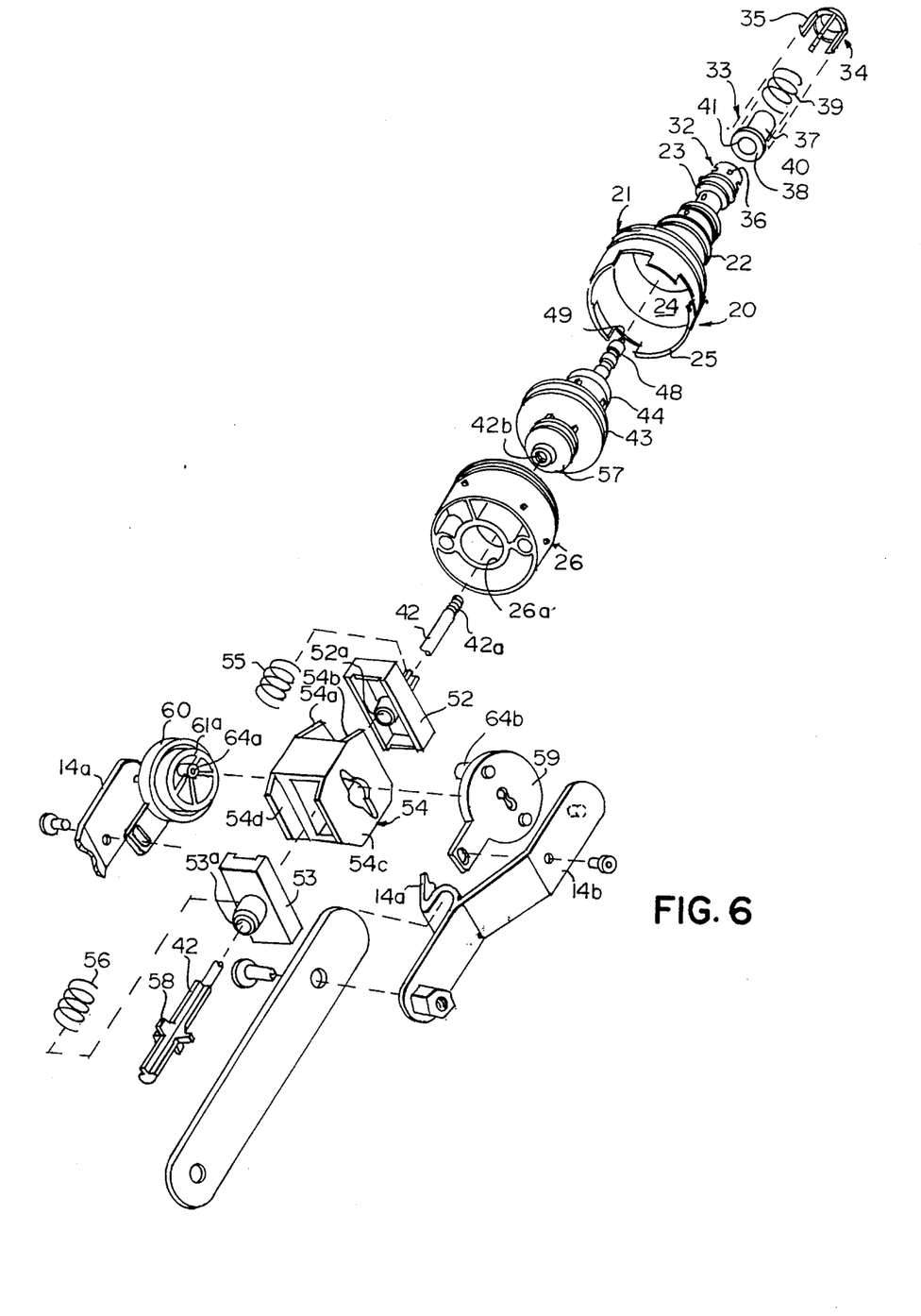
FIG. 6 is an exploded view of the various components contained within the valve housing.
Figure 7:
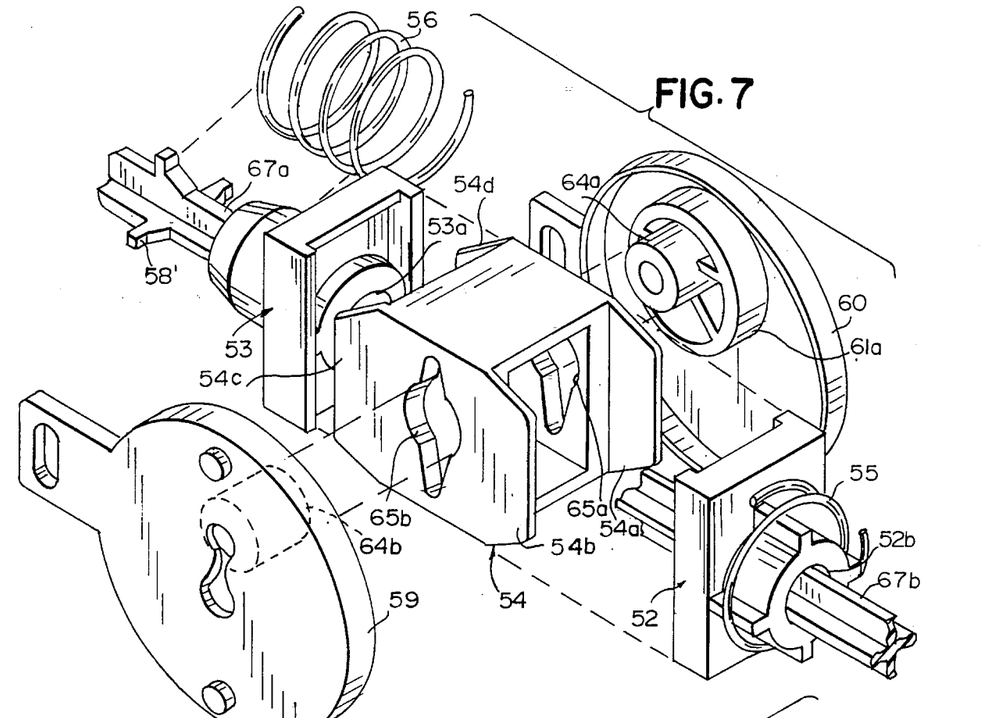
FIG. 7 is an exploded view of the major components of the invention relating to the actuating mechanism.
Figure 8:
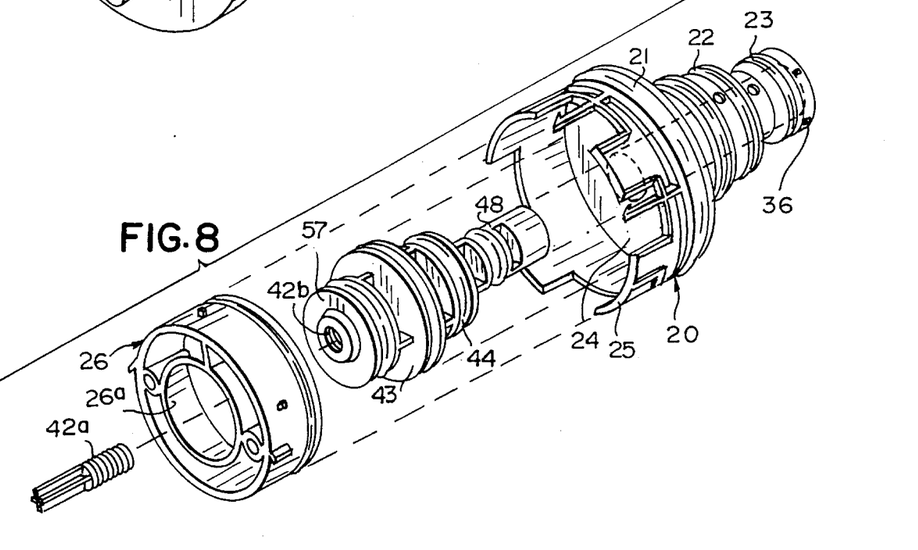
FIG. 8 is an exploded view of the components comprising the dampener and dump assembly.

Referring now to FIGS. 4–8, the details of the various components of the leveling valve are disclosed. FIG. 4 discloses the leveling valve 10 constructed of an elongated body 15 made up of two molded zinc body parts 15a and 15b. Body part 15a includes dampening cylinder cavity 17 and actuating mechanism cavity 19. Body part 15b includes cavity 18 for the dump cylinder and valve means. Located within the cavity 17 and partly within cavity is the dampening, dumping, and valve subassembly 20 which includes the dampening cylinder 21 molded integrally with the dump cylinder 22 which in turn is molded integrally with the valve housing 23 (FIGS. 4, 6, and 8).

Dumping cylinder 21 includes a chamber 24 and an open end 25 in which is secured the cap 26 by means of snap legs (not shown). Pop rivets 27 are shown closing off the openings 27a through which fluid is introduced in one and the other permitting the air to escape as the fluid is introduced into the chamber 24. The cap 26 has a bore or opening 26a. A dampening piston 43 is located in chamber 24 and includes a hub 57 extending into opening 26a. Piston 43 has a metered opening 43a permitting fluid to pass from one face of the piston 43 to its other face.

The dampening cylinder 22 includes a chamber 28 and an opening 29 communicating with the dump pilot port 13. Chamber 28 receives the dump piston 44.

Valve housing 23 includes a plunger guide 30, a circular valve seat 31, and a cylindrical end 32 extending outwardly to the right as viewed in FIG. 4. End 32 receives the valve element 33 which is held in the end 32 by means of a cage 34, snap-fitted into the end 32 by the legs 35 which snap into openings 36 (see FIGS. 6 and 8).

FIGS. 4, 9, 10, 11, and 12 best disclose the valve construction for controlling the flow of air from the inlet port 11, delivery port 12, and dump pilot port 13. This valve construction is very similar to that disclosed in assignee's U.S. Pat. No. 5,161,579 with two exceptions which are unique to the present invention and are patentable features of this invention. The first feature is the pintel 49 provided on the extreme end of plunger 48 which will now be described in relation to the other parts of the valve means including valve element 33.

Valve element 33 comprises a hollow stem 37 having the flared end 40 which the flexible member 38 is fitted to provide a sealing surface which in the neutral position of the valve is seated on the valve seat 31 by means of the coil spring 39 exerting a bias against the flared end 40. Stem 37 and flexible member 38 of the valve element 33 includes an opening 41 (FIGS. 6 and 9) through which air can flow out of the exhaust port 16 when it is not blocked by the plunger 48. Pintel 49 on the extreme end of plunger 48 extends into opening 41 to provide the unusual and unexpected result of reducing air consumption, thus resulting in the increasing of compressor life, savings in fuel consumption, permission of more functions from smaller compressors, and reduced variations in the suspension ride height. Pintel 49 is preferably a basic cylindrical shape which extends past the seal surface when plunger 48 engages valve element 33. It is precisely dimensioned to create a metered flow as it is drawn away from engagement with the flexible member of valve element 33 as disclosed in FIG. 9. Thus, it controls the quantity of air flowing out of exhaust port 16. The length of the pintel 49 determines the angle of actuator arm 14 over which the air flow is controlled. Thus, not only is there a reduction in the air consumption but, in addition, a great deal of variation is eliminated as the air springs adjust to find the proper height. Reduction in air consumption is also accomplished by metering the air flowing from the inlet port 11 to the delivery port 12 which is the second unique feature of the valve construction. The structure that makes this possible is disclosed best by FIGS. 11 and 12 wherein is disclosed enlarged partial drawings of the valve seat 31, valve element 33, and plunger 48. Reference numeral 32 designates the cylindrical end 21 of valve housing 23 (FIG. 6) in which valve seat 31 is located. In the cross sections of FIGS. 4, 9, and 10, the openings in this valve housing through which the air flows from port 11 to port 12 appear to be open around the entire circumference of valve seat 31. However, as disclosed in FIG. 12, these openings designated by reference numerals 70a and 70b are small metered openings located above and below the seat 31, respectively. As a result, when valve element 33 is opened by plunger 49, the path of the air flow is through these small openings 70a and 70b. It is these metered openings which conserve air as the valve element 33 is opened and closed by variable loads on axle support 3.

Another unique feature of the present invention is the construction of the elongated valve actuator which includes several components, including plunger 42, dampening piston 43, dump piston 44, and plunger 48. As will be noted in FIGS. 4, 6, 9, and 10, dampening piston 43, dumping piston 44, and plunger 48 are one integrally molded piece to which plunger 42 is adjustably secured by its threaded end 42a threaded into the tapped opening 42b in dampening piston 43 and dump piston 44. It should be understood that this construction of the elongated actuator involves only two parts at a tremendous savings in cost in molding and assembly. Further, the adjustability of plunger 42 with relation to cylinders 43, 44 and plunger 48, allows for an adjustment of the length of the actuator.

It should be realized from the above description and from the drawings, that movement of the actuator comprising plunger 42, piston 43, piston 44, and plunger 48 longitudinally of the housing or body 15 controls the flow or non-flow of the air through the ports 11, 12, 13, and 16. In the neutral position as disclosed in FIG. 4, there is no flow of air through any of the ports. However, as previously explained, when a load is placed on or removed from the vehicle causing the frame 1 to move downwardly or upwardly, respectively, the valve will be actuated by movement of the actuator to either deliver or exhaust air from the air spring 2. The actuating mechanism for causing the movement of the actuator will now be described.

Actuating mechanism 50, which is located in the cavity 19 of body part 15a, actuates plunger 42 which in turn moves piston 43, piston 44, and plunger 48 to control the mode of the valve means within the valve housing 23, that is, whether the valve means provides communication between the inlet and delivery ports or delivery and exhaust ports or closes off all communication between the ports. Actuating mechanism 50 includes a sleeve assembly 51 constructed of three parts including end parts 52 and 53 and the center part 54. Center part 54 is a box-like member having an opening 65a in one side and opening 65b in the opposite side with flanges 54a and 54b extending from one end and flanges 54c and 54d extending from the opposite end. End part 52 is located between flanges 54a and 54b and end part 53 is located between flanges 54c and 54d. Center part 54 is hollow for receiving plunger 42. This construction permits center part 54 to move transversely and longitudinally of plunger 42 and during the transverse movement slide between the flanges of the end parts. End parts 52 and 53 have bores 52a and 53a, respectively, through which plunger 42 extends. Bore 52a includes a reduced bore position 52b thereby forming shoulder 66. Plunger 42 includes a plurality of flutes 67a and 67b of which flutes 67a are longer than flutes 67b. When in neutral position, shoulder 66 abuts flutes 67a.

The entire sleeve assembly 51, preferably constructed of lubricous plastic is slideably mounted on plunger 42. The sleeve assembly 51 is held in position on plunger 42 by springs 55 and 56. Spring 55 is mounted circumferentially around plunger 42 and abuts against the end part 52 and the hub 57 of the piston 43. Spring 56 abuts against the end part 53 and the spokes 58 at the end of plunger 42. Spring 55 is a larger spring than spring 56 and thus has a greater biasing force so that plunger 42 is biased into a neutral position when permitted by the eccentrically rotatable members or discs 59 and 60 (FIGS. 5–7). In the neutral position, the shoulder 66 of end part 52 abuts against the enlarged flutes 67a of the plunger 42. Discs 59 and 60 include hubs 61a and 61b which extend into circular openings 62a and 62b, respectively, in which is also located the bushings 63a and 63b, respectively. The discs 59 and 60 are rotatable about the axis X (FIG. 5) by means of the fork-shaped actuator member 14 which includes the arm 14a secured to disc 60 and 14b secured to disc 59. Pins 64a and 64b are eccentrically mounted within the hubs 61a and 61b, respectively, and extend a distance beyond the hubs into the openings 65a and 65b of the center part 54 of sleeve assembly 51. As disclosed in FIG. 5, pins 64a and 64b fit tightly within the openings 65a and 65b so as to minimize or substantially avoid any wear on the pins 64a and 64b or the sides of the openings 65a and 65b. Extending upwardly and downwardly of openings 65a and 65b are slots 68a, 68b, and 69a, 69b, respectively. These slots permit openings 65a and 65b to collapse under the force exerted by parts 52 and 53 under the biasing forces of springs 55 and 56 therefore compensating for any wear on the openings or pins 64a and 64b. It should be evident from this construction that rotation of the discs 59 and 60 by the actuator member 14 causes the center part 54 of the sleeve assembly to simultaneously move longitudinally and transversely of the plunger 42. Movement of the center part 54 to the right, as viewed in FIG. 5, moves end part 52 to the right, as viewed in FIG. 5, thus exerting a pressure on spring 55 which is transmitted to plunger 48 through the hub 57, piston 43, and piston 44 (FIG. 4). The movement of plunger 48 to the right, as viewed in FIG. 4, unseats the flexible member 38 of the valve element 33 opening the port through the valve seat 31.

Movement of the center part 54 to the left, as viewed in FIG. 5, places a force on end part 53 which is transmitted through spring 56 which engages spokes 58. Spring 56 is sufficiently strong to force plunger 42 to the left, causing the extreme end 80 of plunger 42 to slide in recess 81, which recess is provided to assist in guiding plunger 42 in its longitudinal movement.

As previously disclosed, plunger 42 is adjustable within the tapped opening 42b. Thus, the neutral position in which shoulder 66 abuts against the enlarged flutes 67a of plunger 42 can be adjusted. Further, it should be evident as previously disclosed that the force exerted by actuating mechanism 50 is substantially greater in a direction along the axis of the actuator as opposed to the force exerted transversely thereof, which is an improvement over the actuating mechanism of U.S. Pat. No. 5,161,579.

OPERATION

Having disclosed the construction of the leveling valve of this invention, the operation will now be described in relation to its operation on a vehicle as schematically disclosed in FIG. 1.

The valve 10 is in neutral position when the flexible valve member 38 of the valve element 33 is seated against the valve seat 31 and the extreme end of plunger 48 only engages the valve element 33 with the pintel 49 extending into opening 41 of the flexible member 38. In this position, there is no communication between inlet port 11, delivery port 12, and exhaust port 16 so that there is no flow of air through the valve.

Now assuming that a load is placed on the frame 1 which changes the distance between frame 1 and axle support 3, the actuator arm 14 is forced upwardly and the two arms 14a and 14b rotate the discs 59 and 60. This causes the inner part 54 of sleeve assembly 51 to be moved downwardly toward the right, as viewed in FIG. 4, and force end part 52 to the right against the bias of spring 55 which is sufficiently strong to transmit a force on hub 57 which in turn is transmitted through pistons 43 and 44 to plunger 48 which abuts against the flexible valve element 38 of valve element 33 causing plunger 48 to unseat the valve element 33. As disclosed in FIG. 10, unseating valve element 33 opens communication between the inlet port 11 and the delivery port 12 which delivers pressurized air to the air spring 2 causing it to lift the frame 1 until the original position, as disclosed in FIG. 1, is reached at which time the plunger is withdrawn to the neutral position, as shown in FIG. 4, and the flexible member of valve element 33 again seats on the seat 31 to close off all communication between the ports.

As previously disclosed, the flow of air from inlet port 11 to delivery port 12 is metered by the small openings 70a and 70b (FIGS. 11 and 12) which aids in reducing the consumption of the air as the air springs adjust to find the proper height.

During this operation, there is a time delay or "time to travel" created by the dampener piston 43 as the viscous fluid in the chamber 24 moves from one side of the piston 43 to the other through the metered opening 43a. Thus, undesirable fluctuations are eliminated by the dampener piston 43. In addition, springs 55 and 56 assist in eliminating many of such undesirable fluctuations as well as providing a means for returning the plunger 42 to the neutral position.

Assuming that a load is taken off from frame 1, air spring 2 will cause the distance between frame 1 and axle support 3 to increase. In this event, the actuator arm 14 is pulled downwardly causing the discs 59 and 60 to rotate in a counterclockwise direction and the sleeve assembly 51 to be actuated downwardly and in a direction toward the left as viewed in FIG. 4. As the center part 54 of sleeve assembly 51 is moved to the left, it forces end part 53 to the left against the bias of spring 56. Plunger 42 follows by virtue of the compression of spring 56 attached to the plunger 42. In other words, the spring 56 has sufficient strength to transmit a force against the spokes 58 to move plunger 42 in the left direction, the plunger being guided at its end 80 in the recess 81. In the movement of plunger 42 in a direction to the left, as viewed in FIG. 4, it carries piston 43, piston 44, and plunger 48 along with it, thus withdrawing plunger 48 from valve element 33 and withdrawing pintel 49 from the opening 41 in the flexible member 38. This permits the air in air spring 2 to exhaust through opening 41 through the interior passageway 37 of valve stem 37 and out through exhaust port 16. As previously explained, the pintel 49 meters the flow of the air as it flows through opening 41, the degree of such metering being determined by the diameter and length of pintel 49.

During the actuation of center part 54 as above described, it slides on the inward surfaces of end parts 52 and 53 which may cause wear on such surfaces and on the inward surfaces of the end parts. However, any such wear is compensated for by the springs 55 and 56 constantly forcing such surface into engagement. Further, as previously described, springs 55 and 56, exerting forces on end parts 52 and 53, cause openings 65a and 65b to collapse in the event of wear on the openings or on pins 64a and 64b.

Figure 9:
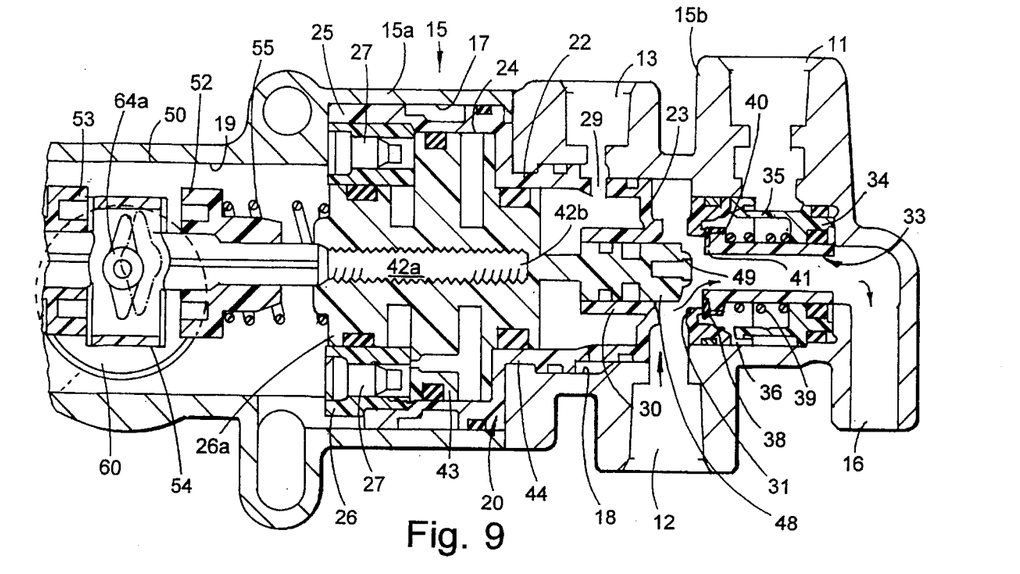
FIG. 9 is a cross-sectional view of the port end of the valve of this invention illustrating one position of the valve means as actuated by the dump piston.
Figure 10:
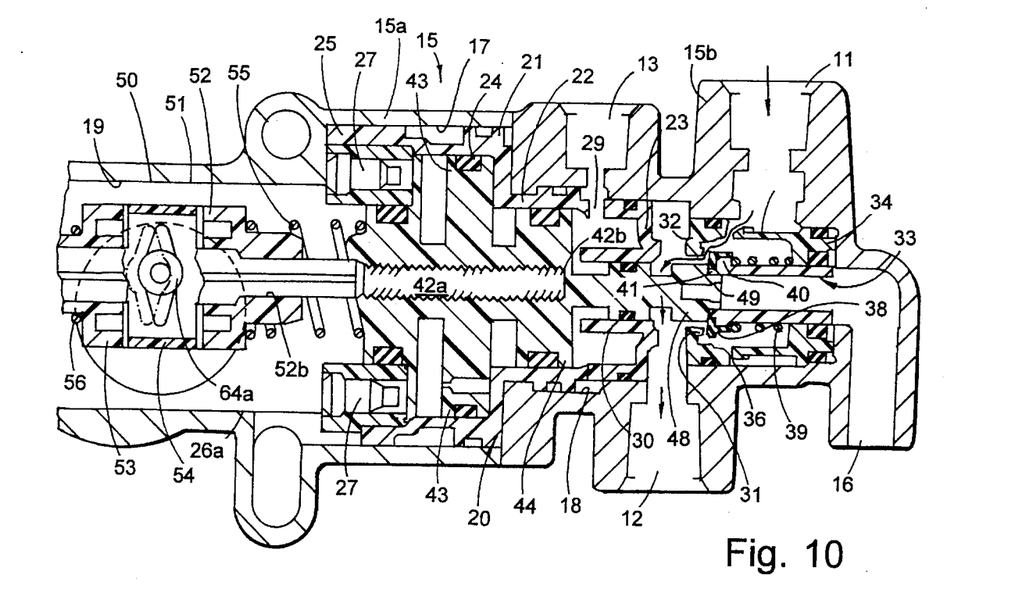
FIG. 10 is another cross-sectional view of the port end of the valve illustrating the position of the valve means when air is being delivered to the air spring.

FIG. 9 illustrates the path of the air exhausting from the air spring 2 by reason of the withdrawal of plunger 48 away from the valve element 33 which results when the actuator mechanism withdraws the plunger to the position of FIG. 9. It should be understood that the degree of metering by the pintel 49 depends upon the angle of the actuator arm 14 in that the size of the area through which the air can flow varies in accordance with the angle of the actuator arm 14, which determines the distance plunger 48 is withdrawn from the flexible member 38 of the valve element 33.

FIG. 9 discloses the withdrawal of plunger 48 by means of the dump piston 44. As disclosed in FIGS. 4 and 9, the dump cylinder 18 has a chamber 28 behind the dump piston 44. Chamber 28 is in communication with the dump pilot port 13. Thus, pressurized air can be provided to the back of the dump piston 44 by actuating valve 9 (FIG. 1) located in the dump pilot tube 8 which is connected to the dump pilot port 13. When the air is introduced to the back of piston 44, it is pushed to the left, as viewed in FIGS. 4 and 9, thus moving the end of plunger 48 away from the flexible member 38 of the valve element 33, as shown in FIG. 9. This dumping action by piston 44 is made possible by compressing spring 56 while still allowing the center part 54 to retain the position established by the eccentric pins 64a and 64b. Accordingly, at any time when desired, the air spring can be exhausted of the air by opening valve 9, all of this being accomplished primarily within the leveling valve unit 10.

Having described our invention, it will become evident that it is a major improvement made possible by the novel and unique features of our leveling valve. Although we have disclosed the preferred embodiments thereof, it should become evident that various changes and modifications can be made in the art without departing from the spirit and scope of our invention. It is intended that the invention is to be limited only by the scope of the appended claims and all equivalents thereof.

The embodiments of the invention in which an exclusive property or privilege is claimed are defined as follows:

1. In a leveling valve including a valve means actuated by an actuator including an elongated plunger extending along an axis; an actuating mechanism for actuating said plunger to actuate said valve;

a sleeve mounted for sliding movement on said plunger and operatively connected to said plunger for moving said plunger;

spring biasing means mounted on said plunger and exerting a biasing force on each end of said sleeve to normally hold said sleeve and plunger in a position where the valve means in not actuated; said sleeve being slidable in opposite directions on said plunger;

the improvement comprising:

said sleeve comprising at least three parts including first and second end parts and a center part therebetween, each of said parts being slidable on said plunger;

an actuator operatively connected to said center part for slideably actuating said center part;

said center part engageable with said end parts and movable along and transversely of said axis by said actuating mechanism for slideably actuating said end parts and for actuating said plunger; and said spring biasing means biasing said first and second end parts against said center part.

2. The leveling valve of claim 1 in which said actuator includes a rotatable member having an off-center pin engaging said center part.

3. The leveling valve of claim 2 in which one of said center part or said end parts include flanges and the other of said center part or end parts are captured and slidable between said flanges.

4. The leveling valve of claim 2 in which said pin extends into an opening in said second part for slideably actuating said center part; said opening having slots extending from the top and bottom thereof whereby said opening will collapse under the force of said spring biasing means exerting a force on said end parts which is transmitted to said center part, said collapsing taking up any wear in said opening or pin.

5. The leveling valve of claim 1 in which one of said center part or said end parts include flanges and the other of said center part or end parts are captured and slidable between said flanges.

6. In a leveling valve including a valve means actuated by an actuator including an elongated plunger; an actuating mechanism for actuating said plunger to actuate said valve;

a sleeve mounted for sliding movement on said plunger and operatively connected to said plunger for moving said plunger;

spring biasing means mounted on said plunger and exerting a biasing force on each end of said sleeve to normally hold said sleeve and plunger in a position where the valve means is not actuated; said sleeve being slidable in opposite directions on said plunger;

the improvement comprising:

said sleeve comprising at least three parts including first and second end parts and a center part therebetween, each of said parts being slidable on said plunger;

an actuator operatively connected to said center part for slideably actuating said center part;

said center part engageable with said end parts for slideably actuating said end parts and for actuating said plunger; and said actuator including a rotatable member having an off-center pin; said center part including an opening in which said pin extends for slideably actuating said center part; said opening having slots extending from the top and bottom thereof whereby said opening will collapse under the force of said spring biasing means exerting a force on said end parts which is transmitted to said center part, said collapsing taking up any wear in said opening or pin.

7. In a leveling valve including a valve means actuated by an elongated plunger; an actuating mechanism for actuating said plunger to actuate said valve means;

a sleeve operatively connected to said plunger for moving said plunger;

rotatable eccentric means located on opposite sides of said sleeve;

said sleeve receiving said rotatable eccentric means whereby rotation of said eccentric means moves said sleeve longitudinally of said elongated plunger;

the improvement comprising:

said sleeve comprising at least three parts including first and second end parts and a center part therebetween, each of said parts being slidable on said plunger;

said rotatable eccentric means being operatively connected to said center part for slideably actuating said center part;

said center part engageable with said end parts for slideably actuating said end parts and for actuating said plunger; and spring biasing means biasing said first and second end parts against the ends of said center part.

8. The leveling valve of claim 7 which includes a forked actuator arm having a first arm portion connected to said rotatable eccentric means located on one side of said sleeve and a second arm portion connected to said rotatable eccentric means located on the other side of said sleeve; and said first and second arm portions being connected to a third arm portion adapted to be connected to a means which pivots said arm and rotates said eccentric rotatable eccentric means.

9. In a leveling valve for controlling the air pressure in an air spring in response to changes in distance between two members between which the air spring is mounted comprising:

a body;

said body having an air inlet port, an air outlet delivery port, and an air outlet exhaust port;

said inlet port being adapted to be connected to a source of air pressure and said delivery port being adapted to be connected to at least one air spring;

valve means at one end of said body for providing three modes, a first mode providing communication between said inlet and delivery ports, a second mode providing communication between said delivery and exhaust ports, and a third mode for closing off all communication between all of said inlet, delivery, and exhaust ports;

said valve means including a first valve port surrounded by a valve seat, a valve element for seating on said valve seat and having a second port therein, biasing means for holding said valve element on said valve seat; and an actuator having three positions corresponding to said first, second, and third modes, respectively, a first position in which said actuator is engaging said valve element and closing said second port while forcing said valve element to unseat from said valve seat to open said first port, a second position in which said actuator is unengaged from said valve element thereby causing said second port to be open, and a third position in which said actuator is engaging said valve element to close said second port while said valve element is seated on said valve seat;

the improvement comprising:

said actuator including a pintel extending through said second port and having a cross-sectional area and length to provide a metered air flow through said second port when said actuator is in said second position.

10. The leveling valve of claim 9 in which the second port is circular in cross section and said pintel is cylindrical, the relative diameters of said second port and pintel being selected to control the quantity of air flowing through the exhaust port when said actuator is in said second position.

11. The leveling valve of claim 10 in which the length of said pintel is dependent upon the distance of travel of said actuator in moving from said third position to said second position and the quantity of air flow desired through said exhaust port.

12. In a leveling valve for controlling the air pressure in an air spring in response to changes in distance between two members between which the air spring is mounted comprising:

an elongated body;

said elongated body having an air inlet port, an air outlet delivery port and an air outlet exhaust port located at one end of said elongated body;

said inlet port being adapted to be connected to a source of air pressure and said delivery port being adapted to be connected to at least one air spring;

valve means located at one end of said elongated body for either providing communication between said inlet and delivery ports or said delivery and exhaust ports or for closing off all communication between all of said inlet, delivery, and exhaust ports;

an actuating mechanism located at the other end of said elongated body, said actuating mechanism being responsive to changes in the distance between said two members;

elongated actuator means extending from one end of said elongated body to the other end and operatively connected at one end to said actuating mechanism and at its other end to said valve means;

dampening means located in said elongated body for minimizing undesirable fluctuation in the actuation of said valve means;

said dampening means including a dampening cylinder having an inner chamber in which is located a dampening piston;

said dampening piston being of less width dimension than the length of said chamber providing sufficient space for containing a fluid on each side of said dampening piston;

means provided to pass metered amounts of said viscous fluid from one side to the other of said dampening piston as said dampening piston moves longitudinally in said chamber;

the improvement comprising:

said actuator means comprising the combination of a plunger operatively connected to said actuating mechanism, said dampening piston connected to said plunger, and said dampening piston having an extension formed as an integrally molded part with said dampening piston, said extension including a second plunger extending to said valve means for actuating said valve means.

13. The leveling valve of claim 12 in which said plunger is adjustably attached to said dampening piston for adjusting the length of said elongated actuator means within said elongated body.

14. The leveling valve of claim 13 in which a dump cylinder is located between said dampening cylinder and said second plunger and said dump cylinder is molded integrally with said dampening cylinder; said dump cylinder having a dump chamber; a dump piston located in said dump chamber; a dump pilot port provided in said elongated body and communicating with said dump chamber.

15. The leveling valve of claim 14 in which said dampening piston and said dump piston are integrally molded into one piece.

16. The leveling valve of claim 15 in which said second plunger is integrally molded into one piece with said dampening and dump pistons.

17. The leveling valve of claim 10 in which said valve means provides a first mode providing communication between said inlet and delivery ports, a second mode providing communication between said delivery and exhaust ports, and a third mode for closing off all communication between all of said inlet, delivery, and exhaust ports;

said valve means including a first valve port surrounded by a valve seat, a valve element for seating on said valve seat and having a second port therein, biasing means for holding said valve element on said valve seat; and said second plunger having three positions corresponding to said first, second, and third modes, respectively, a first position in which said second plunger is engaging said valve element and closing said second port while forcing said valve element to unseat from said valve seat to open said first port, a second position in which said second plunger is unengaged from said valve element and thereby causing said second port to be open, and a third position in which said second plunger is engaging said valve element and closing said second port while said valve element is seated on said valve seat;

said second plunger including a pintel extending through said second port and having a cross-sectional area and length to provide a metered air flow through said second port when said second plunger is in said second position.

18. The leveling valve of claim 17 in which the second port is circular in cross section and said pintel is cylindrical, the relative diameters of said second port and pintel being selected to control the quantity of air flowing through the exhaust port when said second plunger is in said second position.

19. The leveling valve of claim 18 in which the length of said pintel is dependent upon the distance of travel of said second plunger in moving from said third position to said second position and the quantity of air flow desired through said exhaust port.

20. The leveling valve of claim 17 in which said valve seat is located in a housing; at least one metered opening in said housing, said opening being in communication with said inlet port and said first valve port when said valve element is unseated from said valve seat, said valve element when seated on said valve seat shutting off communication between said opening and said first valve port.

21. The leveling valve of claim 12 in which said valve means provides a first mode providing communication between said inlet and delivery ports, a second mode providing communication between said delivery and exhaust ports, and a third mode for closing off all communication between all of said inlet, delivery, and exhaust ports;

said valve means including a first valve port surrounded by a valve seat, a valve element for seating on said valve seat and having a second port therein, biasing means for holding said valve element on said valve seat; and said second plunger having three positions corresponding to said first, second, and third modes, respectively, a first position in which said second plunger is engaging said valve element and closing said second port while forcing said valve element to unseat from said valve seat to open said first port, a second position in which said second plunger is unengaged from said valve element and thereby causing said second port to be open, and a third position in which said second plunger is engaging said valve element and closing said second port while said valve element is seated on said valve seat; and said valve seat being located in a housing; at least one metered opening in said housing, said opening being in communication with said inlet port and said first valve port when said valve element is unseated from said valve seat, said valve element when seated on said valve seat shutting off communication between said opening and said first valve port.

22. In a leveling valve for controlling the air pressure in an air spring in response to changes in distance between two members between which the air spring is mounted comprising:

an elongated body;

said elongated body having an air inlet port, an air outlet delivery port and an air outlet exhaust port;

said inlet port being adapted to be connected to a source of air pressure and said delivery port being adapted to be connected to at least one air spring;

valve means for either providing communication between said inlet and delivery ports or said delivery and exhaust ports or for closing off all communication between all of said inlet, delivery, and exhaust ports;

elongated actuator means extending from one end of said elongated body to the other end and operatively connected to said valve means;

an actuating mechanism, said actuating mechanism being responsive to changes in the distance between said two members and operatively connected to said elongated actuator means;

said actuating mechanism including a sleeve mounted for sliding movement on said plunger and operatively connected to said plunger for moving said plunger;

spring biasing means mounted on said plunger and exerting a biasing force on each end of said sleeve to normally hold said sleeve and plunger in a position where the valve means is not actuated;

said sleeve comprising at least three parts including first and second end parts and a center part therebetween, each of said parts being slideable on said plunger;

an actuator operatively connected to said center part for slideably actuating said center part;

said center part engageable with said end parts for slideably actuating said end parts and for actuating said plunger;

dampening means located in said elongated body for minimizing undesirable fluctuation in the actuation of said valve means;

said dampening means including a dampening cylinder having an inner chamber in which is located a dampening piston;

said elongated actuator means comprising a plunger operatively connected to said actuating mechanism, said plunger being connected to said dampening piston, and said dampening piston having an extension including a second plunger integrally molded with said dampening piston and extending therefrom to said valve means for actuating said valve means; and a dump cylinder located between said dampening cylinder and second plunger, said dump cylinder molded integrally with said dampening cylinder and said second plunger; said dump cylinder having a dump chamber; a dump piston located in said dump chamber of said dump cylinder integrally molded with and between said dampening piston and second plunger; a dump pilot port provided in said elongated body and communicating with said dump chamber.

23. The leveling valve of claim 22 in which said valve means provides a first mode providing communication between said inlet and delivery ports, a second mode providing communication between said delivery and exhaust ports, and a third mode for closing off all communication between all of said inlet, delivery, and exhaust ports;

said valve means including a first valve port surrounded by a valve seat, a valve element for seating on said valve seat and having a second port therein, biasing means for holding said valve element on said valve seat; and said second plunger having three positions corresponding to said first, second, and third modes, respectively, a first position in which said second plunger is engaging said valve element and closing said second port while forcing said valve element to unseat from said valve seat to open said first port, a second position in which said second plunger is unengaged from said valve element and thereby causing said second port to be open, and a third position in which said second plunger is engaging said valve element and closing said second port while said valve element is seated on said valve seat;

said second plunger including a pintel extending through said second port and having a cross-sectional area and length to provide a metered air flow through said second port when said second plunger is in said second position.

24. The leveling valve of claim 23 in which the second port is circular in cross section and said pintel is cylindrical, the relative diameters of said second port and pintel being selected to control the quantity of air flowing through the exhaust port when said second plunger is in said second position.

25. In a leveling valve for controlling the air pressure in an air spring in response to changes in distance between two members between which the air spring is mounted comprising:

a body;

said body having an air inlet port, an air outlet delivery port, and an air outlet exhaust port;

said inlet port being adapted to be connected to a source of air pressure and said delivery port being adapted to be connected to at least one air spring;

valve means at one end of said body for providing three modes, a first mode providing communication between said inlet and delivery ports, a second mode providing communication between said delivery and exhaust ports, and a third mode for closing off all communication between all of said inlet, delivery, and exhaust ports;

said valve means including a first valve port surrounded by a valve seat, a valve element for seating on said valve seat and having a second port therein, biasing means for holding said valve element on said valve seat; and an actuator having three positions corresponding to said first, second, and third modes, respectively, a first position in which said actuator is engaging said valve element and closing said second port while forcing said valve element to unseat from said valve seat to open said first port, a second position in which said actuator is unengaged from said valve element thereby causing said second port to be open, and a third position in which said actuator is engaging said valve element to close said second port while said valve element is seated on said seat valve;

the improvement comprising:

said valve seat being located in a housing; at least one metered opening in said housing, said opening being in communication with said inlet port and said dust valve port when said valve element is unseated from said valve seat, said valve element when seated on said valve seat, shutting off communication between said opening and said first valve port.

26. The leveling valve of claim 25 in which said opening is located immediately adjacent said valve seat.

27. The leveling valve of claim 26 in which said opening is located radially outwardly of said valve seat.

* * * * *

UNITED STATES PATENT AND TRADEMARK OFFICE
CERTIFICATE OF CORRECTION

PATENT NO.   :   5,560,591
DATED        :   October 1, 1996
INVENTOR(S)  :   Curtis A. Trudeau et al.

It is certified that error appears in the above-identified patent and that said Letters Patent is hereby corrected as shown below:

Column 10, Claim 8, Line 20;

Delete "eccentric".

Column 12, Claim 17, Line 1;

"10" should be --12--.

Column 14, Claim 25, Line 65;

"seat valve" should be --valve seat--.

Column 15, Claim 25, Line 3;

"dust" should be --first--.

Signed and Sealed this

Twenty-fifth Day of March, 1997

*Attest:*

BRUCE LEHMAN

*Attesting Officer*       *Commissioner of Patents and Trademarks*